United States Patent
Nguyen et al.

(10) Patent No.: US 6,814,120 B1
(45) Date of Patent: Nov. 9, 2004

(54) FABRIC SUPPORT FOR METAL REINFORCED INNER PLY OF RUNFLAT TIRE

(75) Inventors: Gia Van Nguyen, Rossignol (BE); Laurent Colantonio, Cobru (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/018,669

(22) PCT Filed: Jul. 1, 1999

(86) PCT No.: PCT/US99/14963

§ 371 (c)(1),
(2), (4) Date: Dec. 12, 2001

(87) PCT Pub. No.: WO01/02195

PCT Pub. Date: Jan. 11, 2001

(51) Int. Cl.[7] .................. B60C 17/00; B60C 17/08; B60C 9/00
(52) U.S. Cl. .................. 152/517; 152/548; 152/555
(58) Field of Search .................. 152/516, 517, 152/555, 563

(56) References Cited

U.S. PATENT DOCUMENTS

| | | | |
|---|---|---|---|
| 3,464,477 A | * | 9/1969 | Verdier .................. 152/535 |
| 3,954,131 A | * | 5/1976 | Hoshino .................. 152/517 |
| 3,980,119 A | | 9/1976 | Nakasaki |
| 4,024,901 A | * | 5/1977 | Poque .................. 152/541 |
| 4,193,437 A | | 3/1980 | Powell | 
| 4,287,924 A | | 9/1981 | Deck et al. |
| 4,510,984 A | | 4/1985 | Kishida et al. |
| 5,238,040 A | * | 8/1993 | Ghilard .................. 152/517 |
| 6,209,604 B1 | * | 4/2001 | Nishikawa et al. .......... 152/548 |
| 6,269,857 B1 | * | 8/2001 | Kanai et al. ............... 152/517 |

FOREIGN PATENT DOCUMENTS

| | | |
|---|---|---|
| EP | 0157761 | 10/1985 |
| EP | 0287497 | * 10/1988 |
| EP | 0385192 | 9/1990 |
| EP | 0507184 | 10/1992 |
| EP | 0922593 | 6/1999 |
| FR | 2419179 | 10/1979 |
| GB | 758914 | 10/1956 |
| JP | 1-297306 | * 11/1989 |
| LU | 53 950 | 3/1968 |
| WO | WO98/54012 | 12/1998 |

* cited by examiner

Primary Examiner—Blaine Copenheaver
Assistant Examiner—Justin Fischer
(74) Attorney, Agent, or Firm—Howard M. Cohn

(57) ABSTRACT

Fabric treatment layers (130a, 130b, 132a, 132b) are deployed in the sidewall regions of a runflat tire (100) having a metal-reinforced first ply (120). In one embodiment, parallel cord, reinforced fabric treatment layers (130a, 130b, 132a 132b) sandwich the metal forced first ply (120) and inhibit buckling of the reinforcing cords (70) of the first ply during runflat operation when the ply cords or wires are bearing compression loads. In another embodiment, a single woven fabric treatment layer (170a, 170b) is disposed in each sidewall region (152,154) at a location immediately axially inward of the metal-reinforced first ply (160).

20 Claims, 5 Drawing Sheets

FABRIC SUPPORT FOR METAL REINFORCED INNER PLY OF RUNFLAT TIRE

TECHNICAL FIELD

The present invention relates to pneumatic, radial ply runflat tires and, more specifically, to the wedge-insert reinforced sidewalls of radial ply runflat tires having a metal-reinforced inner ply.

BACKGROUND OF THE INVENTION

Various methods have been devised for enabling the safe continued operation of unpressurized or underpressurized passenger-car tires without damaging the tire further and without causing poor steering and vehicle handling, over a distance from the place where the tire lost its pressure to a place desired by the driver, such as a service station where the tire can be changed. Loss of tire pressure can result from a variety of causes, including puncture by a foreign object such as a nail or other sharp object piercing the pneumatic tire installed on a vehicle.

Pneumatic tires designed for continued operation under conditions of unpressurization or underpressuration are referred to as extended mobility technology (EMT) tires or simply runflat tires. Runflat tires are capable of being driven in the uninflated condition, whereas the conventional pneumatic tire collapses upon itself when uninflated and supporting a vehicle load. The sidewalls and internal surfaces of EMT tires do not collapse or buckle onto themselves. In general, the terms "EMT" and "runflat" mean that the tire structure alone has sufficient strength to support the vehicle load when the tire is operated in the uninflated state. In particular, the sidewalls are reinforced to carry the tire's load without recourse to the use of other supporting structures or devices that are disposed internal to but separate from the tire.

One approach to runflat tire structural design is described in U.S. Pat. No. 4,111,249, entitled the "Banded Tire," in which a wide hoop or annular band approximately as wide as the tread was placed under the tread. The wide hoop in combination with the rest of the tire structure could support the vehicle weight in the uninflated condition.

Numerous other constructions and methods have been used to achieve workable runflat tire designs. Generally, such tires incorporate the reinforced sidewall designs mentioned above. Such sidewalls are thicker and stiffer, so that the tire's load can be carried by the uninflated tire without otherwise compromising vehicle handling until such reasonable time as the tire can be repaired or replaced. The specific methods used in sidewall stiffening include the incorporation of inserts or fillers generally having, in cross-sectional view, a crescent shape. Such inserts, or wedge inserts as they are often called, are located within the sidewall portion of the tire carcass, which is the region in the tire usually having the lowest rigidity. In such runflat designs, the entire sidewall has an approximately uniform thickness in the region extending radially outward from the bead region to the tire shoulder.

The thick sidewalls of such tires, when operated in the uninflated condition, experience a net compressive load, though the outer portions of the sidewalls are necessarily in tension due to the bending stresses while the inside portions are correspondingly in compression. This is especially the case in the regions of the sidewall that are near the midway point between the tire's bead region and that portion of the tread most immediately adjacent to the ground-contacting portion of the tread. Due to the large amounts of rubber required to stiffen the sidewall members, heat buildup (deriving from cyclical flexure of the sidewalls) is a major factor in tire failure especially when the tire is operated in the uninflated condition for prolonged periods and at high speeds.

U.S. Pat. No. 5,368,082 ('082), having a common assignee with the present application, disclosed the first commercially accepted runflat pneumatic radial ply tire. The '082 patent describes the employment of special sidewall inserts to improve stiffness. Approximately six additional pounds of weight per tire was required to support an 800 lb load in this uninflated tire. This earlier invention, although superior to prior attempts at runflat tire design, still imposed a weight penalty that could be offset by the elimination of a spare tire and the tire jack. However, this weight penalty was even more problematic for high-aspect-ratio tires such as those used with large touring sedans. The required supported weight for an uninflated luxury car tire approximates 1400 lbs. These taller sidewalled tires, having-aspect ratios in the 55% to 65% range or greater, means that the sidewall bending stresses are several times those of the earlier low-aspect-ratio runflat tires. Such loads meant that the sidewalls and overall tire had to be stiffened to the point of adversely influencing riding comfort, of luxury vehicles. Accordingly, the engineering requirements for runflat tire design require that there be none or minimal loss in riding comfort or vehicle handling.

In very stiff suspension performance type vehicles such as sport cars and various sport/utility vehicles, the ability to provide reinforced-sidewall runflat tires was relatively straightforward compared to providing similar runflat tires for luxury sedans requiring a softer ride. Light truck and sport utility vehicles, although not as sensitive to ride performance, provide a runflat tire market that ranges from accepting a stiffer ride to demanding the softer luxury type ride.

Runflat tire design, as disclosed, for example, in U.S. patent application Ser. No. 08/865,489, entitled "Runflat Tire with Improved Carcass," is based on the installation of one or more wedge inserts within each sidewall flex area. The inserts supply the necessary sidewall rigidity in the absence of air pressure during runflat operation. While the high resistance to compression of the compound of the wedge inserts provides the necessary resistance to the collapse of the loaded tire without air pressure, this design has several drawbacks. The two most important ones are increased tire weight and heat buildup in the wedge inserts, especially at high speed and during runflat operation.

During runflat operation, especially at high speed, the heat buildup in the wedge inserts leads to deterioration and disintegrative failure of the tire. Among the methods used to manage heat buildup due to cyclical flexure of the wedge inserts are the use of low-hysteresis rubber compounds in the fabrication of the wedge inserts as well as ways to conduct the heat away from the wedge inserts, as described in EP-A-729,853 incorporated in its entirety by reference herein. Another method by which to minimize heat buildup is to decrease the magnitude of the flexural strain by adding additional rubber to the sidewall-reinforcing wedge inserts or by incorporating additional strengthening structures such as the a metal reinforced first ply, which is able to carry, with minimal deformation, a large portion of the compressive part of each sidewall's deflected load. An example of a metal-reinforced first ply is disclosed in Patent Application Serial No. PCT/US98/13929, having a common assignee with the present invention. The metal-reinforced first ply carries a large portion of the compressive load on the axially inward-most side of each wedge insert while also serving to redistribute heat and conduct it away from the insert. Accordingly, a runflat tire incorporating such a metal-reinforced first ply contributes to a longer runflat service life and to improved runflat handling, especially at high speeds.

OBJECTS OF THE INVENTION

It is an object of the present invention to provide a light-weight, two-ply runflat radial passenger tire, being as defined in one or more of the appended claims and, as such, having the capability of being constructed to accomplish one or more of the following subsidiary objects.

An object of the present invention is to provide a two-ply runflat radial passenger tire, having good tire life and vehicle handling characteristics and a satisfactory ride under normal inflation conditions, by incorporating a compression-load-bearing metallic reinforced inner radial ply that is itself reinforced against compressive buckling by the use of at least one layer of fabric adjacent to the inner ply in the tire's sidewall regions.

SUMMARY OF THE INVENTION

The present invention relates to a pneumatic radial ply runflat tire having a tread, a casing with two sidewalls, two radial carcass plies extending from and wrapped about two annular beads, an inner liner, a wedge insert in each sidewall and a belt reinforcement structure located radially between the tread and the plies. The first or inner carcass ply is reinforced with metal which, in the sidewall regions is sandwiched between two circumferentially disposed fabric treatments each comprising parallel-aligned cords oriented at opposite or crossed angles of between 20 degrees and 50 degrees with respect to each other. The two circumferentially disposed fabric treatments have radial width of between 20 percent and 80 percent of the maximum radial reach of the respective wedge inserts, preferably between 40 percent and 60 percent of the radial reach of the respective wedge inserts.

In a second embodiment, a single woven fabric treatment is circumferentially disposed axially inward of the metal reinforced first or inner carcass ply within each respective sidewall region of the runflat tire. The single woven fabric treatment in each sidewall region has a radial width of between 20 percent and 80 percent of the maximum radial reach of the wedge inserts in the respective sidewall, preferably between 40 percent and 60 percent of the radial reach of the respective wedge inserts.

BRIEF DESCRIPTION OF THE DRAWINGS

The structure operation, and advantages of the presently preferred embodiment of the invention will become further apparent upon consideration of the following description taken in conjunction with the accompanying drawings, wherein.

DEFINITIONS

Figure 1:
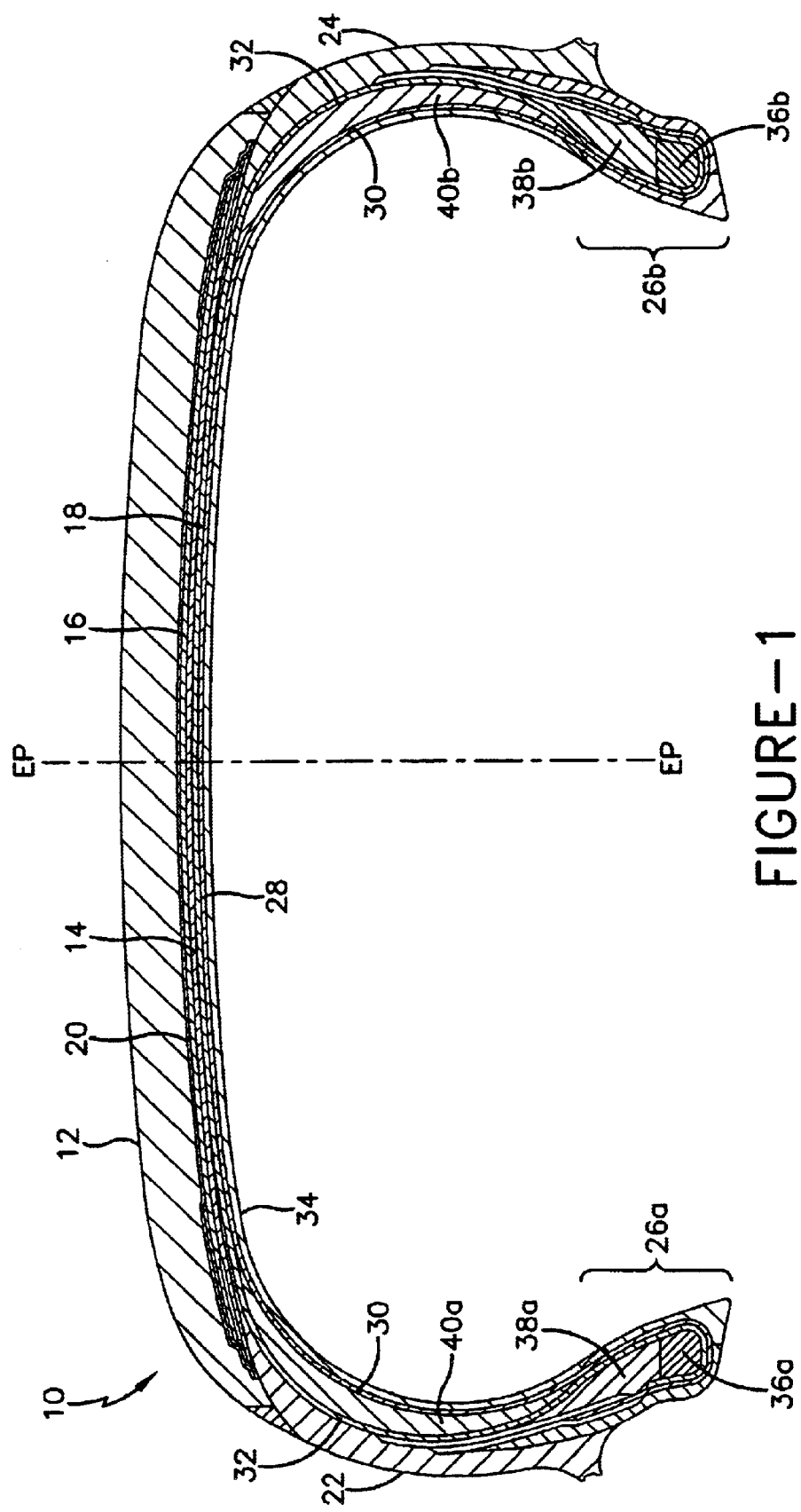
FIG. 1 is a cross-sectional view of a prior art runflat tire having a single wedge insert reinforcement in each sidewall.

"Apex" means an elastomeric filler located radially above the bead core and between the plies and the turnup plies.

"Aspect Ratio" means the ratio of the section height of a tire to its section width; also refers to the cross-sectional profile of the tire; a low-profile tire, for example, has a low aspect ratio.

"Axial" and "Axially" means the lines or directions that are parallel to the axis of rotation of the tire.

"Bead" or "Bead Core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

"Belt Structure" or "Reinforcement Belts" or "Belt Package" means at least two annular layers or plies of parallel cords, woven or unwoven, underlying the tread, unanchored to the bead, and having both left and right cord angles in the range from 18° to 30° relative to the equatorial plane of the tire.

"Breakers" or "Tire Breakers" means the same as belt or belt structure or reinforcement belts.

"Carcass" means the tire structure apart from the belt structure, tread, undertread over the plies, but including the beads.

"Casing" means the carcass, belt structure, beads, sidewalls and all other components of the tire excepting the tread and undertread.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Cord" means one of the reinforcement strands, including fibers, with which the plies and belts are reinforced.

"Crown" or "Tire Crown" means the tread, tread shoulders and the immediately adjacent portions of the sidewalls.

"Equatorial Plane" means the plane perpendicular to the tire's axis of rotation and passing through the center of its tread; or the plane containing the circumferential centerline of the tread.

"EMT" means "extended mobility technology" tire, which means the same as "runflat tire".

"Footprint" means the contact patch or area of contact of the tire tread with a flat surface at zero speed and under normal load and pressure.

"Gauge" refers to thickness.

"Inner liner" means the layer or layers of elastomer or other material that form the inside surface of a tubeless tire and that contain the inflating fluid within the tire.

"Insert" means the same as "wedge insert," which is the crescent-shaped or wedge-shaped reinforcement typically used to reinforce the sidewalls of runflat-type tires; it also refers to the elastomeric non-crescent-shaped insert that underlies the tread.

"Lateral" means a direction parallel to the axial direction.

"Moment of inertia" or "structural moment of inertia" refers to the structural rigidity of a beam section or other structure such as, specifically, the sidewall of a tire. A structure, such as a tire sidewall, having a high moment of inertia is more rigid than a similar structure having a lower moment of inertia.

"Normal inflation pressure" means the specific design inflation pressure at a specified load assigned by the appropriate standards organization for the service condition for the tire.

"Normal load" means the specific design inflation pressure and load assigned by the appropriate standards organization for the service condition for the tire.

"Ply" means a cord-reinforced layer of rubber-coated radially deployed or otherwise parallel cords.

"Radial" and "radially" mean directions radially toward or away from the axis of rotation of the tire.

"Radial ply structure" means the one or more carcass plies or which at least one ply has reinforcing cords oriented at an angle of between 65° and 90° with respect to the equatorial plane of the tire.

"Radial ply tire" means a belted or circumferentially restricted pneumatic tire in which at least one ply has cords which extend from bead to bead and are laid at cord angles between 65° and 90° with respect to the equatorial plane of the tire.

"Runflat" or "runflat tire" is a pneumatic tire that is designed to provide limited service while uninflated or underinflated.

"Section height" means the radial distance from the nominal rim diameter to the outer diameter of the tire at its equatorial plane.

"Section width" means the maximum linear distance parallel to the axis of the tire and between the exterior of its sidewalls when and after the tire has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tangential" and "tangentially" refer to segments of circular curves that intersect at a point through which can be drawn a single line that is mutually tangential to both circular segments.

"Tread cap" refers to the tread and the underlying material into which the tread pattern is molded.

"Tread width" means the arc length of the tread surface in the plane includes the axis of rotation of the tire.

"Wedge insert" means the same as "insert," which is the sidewall reinforcement used in runflat tires.

DETAILED DESCRIPTION OF THE PREFERRED EMBODIMENT

Prior Art Embodiment

With reference to FIG. 1, a cross section of a prior art pneumatic radial ply runflat tire 10 is illustrated. The tire 10 has a tread 12, a belt structure 14 comprising belts 16,18, a fabric overlay 20 disposed between the tread and the belt structure, a pair of sidewall portions 22,24, a pair of bead regions 26a,26b, and a carcass structure 28. The carcass 28 comprises a first of inner ply 30, a second or outer ply 32, and a gas-impervious inner liner 34. The bead regions 26a,26b include a pair of inextensible beads 36a,36b, and a pair of bead filler apexes 38a,38b. The sidewalls 22,24 each contain one sidewall wedge insert 40a,40b, respectively, each of which is disposed between the first ply 30 and the second ply 32. Each wedge insert 40a,40b imparts to the respective sidewall a greater structural moment of inertia, or rigidity, for resisting the cyclical deformations imposed upon the sidewalls during runflat operation. Thus the reinforced sidewall portions 22,24 of carcass structure 28 give the tire 10 a limited runflat capability.

While other prior art runflat tire designs make use of two wedge inserts in each sidewall, the present invention is described with regard to tires having a single wedge insert 40a,40b disposed in each sidewall 22,24, respectively, between the first ply 30 and the second ply 32. However, it is within the scope of the present invention to incorporate the additional fabric treatment on either one side or both sides of the inner ply with a runflat tire having two inserts, as shown for example in FIG. 5A. In such single wedge-insert runflat tire designs, the single wedge insert in each sidewall is often disposed between the two plies 30,32 as shown in FIG. 1, though sometimes each wedge insert is disposed between the inner liner 34 and a single radial ply or a double radial ply. An example of a single insert is disclosed in Patent Application Serial No. PCT/US98/20567 where is described a tire having one wedge insert in each sidewall but without, in one embodiment, an inner liner.

The present invention generally relates to two-ply runflat tires in which the first ply is reinforced with more or less radially aligned metal wires or cords, as disclosed for example in Patent Application Serial No. PCT/US98/13929, having a common assignee with the present invention and which is incorporated in its entirety by reference thereto and where there is described a tire similar in appearance to the tire 10 shown in FIG. 1 in which the first or inner ply is reinforced with steel wires or cords. During runflat operation, this steel-reinforced first ply is subjected to cyclical compressive forces because it lies on the compression side of the neutral bending axis within the wedge-insert-reinforced sidewall regions. Additionally, this first ply, because it incorporates metal reinforcing wires or cords, also is intended to conduct flexure-induced heat from the immediate region of the wedge inserts, which therefore serves to improve the runflat service life of the tire.

Figure 2A:
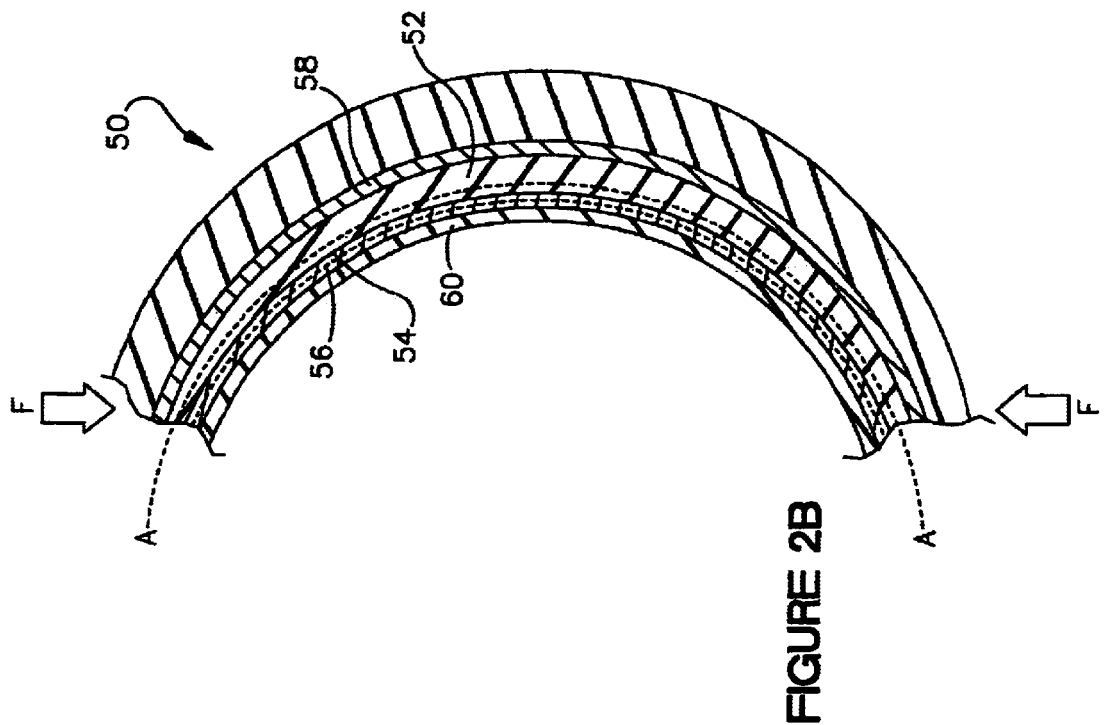
FIG. 2A is a cross-sectional view of a portion of one sidewall, showing the wedge insert and the metal-reinforced first or inner ply.

FIG. 2A is a fragmentary cross-sectional view of a sidewall segment 50 of a tire having the same general design as the tire shown in FIG. 1, except that the first or inner ply 54 is reinforced with metal wires (monofilaments) or cords 56. A single wedge insert 52, which is equivalent to the wedge inserts 40a,40b in FIG. 1, is disposed between a first or inner ply 54 and a second or outer ply 58 which is reinforced with nonmetallic cords (not shown). An inner liner 60, which is functionally equivalent to the inner liner 34 of the prior art tire 10 shown in FIG. 1, is shown adjacent to and axially inward of the first ply 54.

Figure 2B:
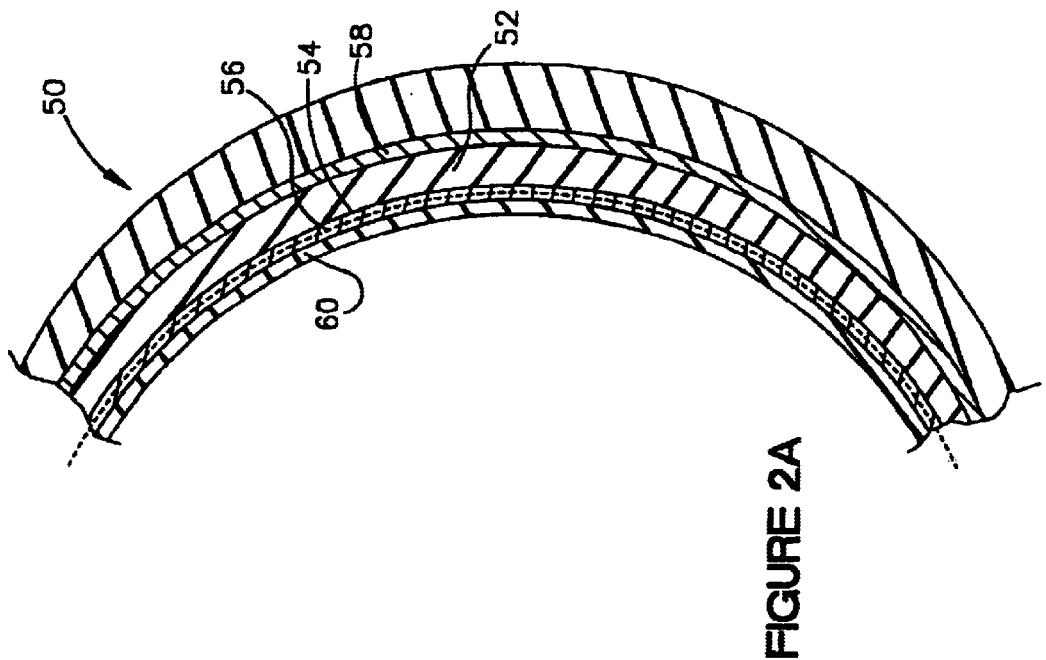
FIG. 2B shows a cross-sectional view of the portion of one sidewall shown in FIG. 2A compressed under a radial load.

FIG. 2B shows the sidewall segment 50 of FIG. 2A being bent or deflected due to the radially directed compressive forces F which represent the loadings upon the sidewalls of the uninflated tire sidewall during runflat operation. The bending effect of the load F upon the sidewall segment 50 shown in FIG. 2E is such that the metal-reinforced first or inner ply 54 is subjected to compressive stresses while the second outer ply 58 is subjected to tensile stresses. The neutral bending axis A—A lies between the two plies, but in a specific location described below.

In FIGS. 2A, 2B, 3 and 4, such parts as the inner liner, the ply layers and the wedge insert are essentially the same despite the use of different identifying numbers in the respective FIGURES. For example, the wedge insert 52 in FIGS. 2A and 2B is essentially the same as the wedge inserts 64,82,128a,128b,168a and 168b shown respectively in the subsequent FIGS. 3 through 6.

In FIG. 2B, the neutral bending axis A—A is shown closer to the first ply 54 than to the second ply 58 because, as those skilled in the art will recognize the metal reinforcing wires or cords 56 have a much higher modulus of elasticity than do the corresponding non-metallic, tensile-stress-bearing reinforcing cords (not shown) of the second ply 58. Also, the modulus of elasticity of the elastomeric compound from which the wedge insert 52 is much lower than those of the metal reinforcing cords 56 of the first ply 54 and the non-metal reinforcing cords (not shown) of the second ply 58. In other words, because the modulus of elasticity of the tensile-bearing reinforcing cords of the second ply 58 and the compression-bearing reinforcing metal cords 56 of the first ply 54 are significantly larger than the modulus of elasticity of the elastomeric compound of which the wedge insert 52 is made, the two ply layers are structurally analogous to the flange members of an I-beam while the wedge insert is analogous to the I-beam's web portion which separates the two flange portions. However, within the context of this I-beam analogy to the rigidifying structure of the sidewall portion 50 shown in FIGS. 2A and 2B, the larger modulus of elasticity of the compression-bearing metal cords or reinforcements 56 of the first ply 54, in comparision to the relatively lower modulus of elasticity of the non-metal reinforcing fibers or cords of the second ply 58, means that the neutral bending axis A—A will perforce be closer to the more rigid first ply 54 of the sidewall segment 50. And so it follows that the compressive forces placed upon the metal reinforcements 56 of the first ply 54 are large compared to the corresponding tensile stresses born by the second ply 58.

During runflat operation, when the total compressive load F reaches a maximum value in the region of the sidewall 50 that is most immediately adjacent to the ground-contacting portion of the tire's tread (not shown), the radial compressive forces to which the more or less radially aligned metal reinforcing wires or cords 56 of the first ply 54 are subjected necessarily impose upon the metal reinforcing wires or cords the potential for buckling. Such buckling corresponds to the kinds of so-called column failures that, in the contexts of mechanical design, must be properly guarded against. Column failure is associated with long, thin structural members loaded in axial compression. In the case of the radially aligned, metallic reinforcing wires or cords 56 shown in FIGS. 2A and 2B, the effect of column failure, or buckling, of the reinforcing wires or cords of the first ply 54 can lead to several results including: (1) the runflat benefits of the supporting metallic wires or cords 56 will be defeated if the metallic reinforcements buckle; and (2) the radially aligned metallic elements, due to the extreme distortion associated with buckling, can become separated from the adjacent elastomeric components of the first ply 54 and also from the material of the wedge insert 52. Such separation of tire components represents a possible mode of tire failure and disintegration during runflat operation. Other modes of failure include heat buildup in the wedge insert 52 and fatigue failures of other tire components due to cyclical flexural effects as the uninflated but loaded tire rolls along. Another possible failure from the buckling is the breaking of the cords due to fatigue failure.

Principle of the Present Invention

The above-described potential for buckling of the radially aligned metal wires or cords 56 of the first or inner ply 54 shown in FIGS. 2A and 2B can be minimized or inhibited by the incorporation of additional supporting structures adjacent to the sidewall portions of the first ply 54.

Before describing such additional supporting structures, the potential for buckling or column failure should be considered with regard to the plane within which such failure might take place. First, the respective reinforcing metal wires or cords 56 are radially oriented and are more or less parallel to one another as well as being closely mutually adjacent (as viewed from a side location that would be perpendicular to the sidewalls). Thus, buckling failure of the respective wires or cords 56 is most likely to occur in the direction that corresponds to the tire's circumferential direction, which is also common with the curved plane of the first ply 54. However, the potential for buckling in an axially outward direction, that is toward the wedge insert 52 is necessarily prohibited or inhibited by the presence of the wedge. Therefore, effectively the only direction within which there exists the possibility for a buckling failure is in the circumferential direction when the cords buckle in the plane of the sidewalls 22,24 in FIG. 1. While the inner liner 60 presents negligible support against axially inward-directed buckling of the metal wires or cords 56, especially when the tire is uninflated and the inner liner 60 is not even supported by air pressure, the curvature of the cords in the sidewalls prevents the buckling in the axially inward direction. Thus the most likely direction of the buckling failure of the reinforcing wires or cords is in the circumferential direction, primarily in the sidewalls of the tire.

Those skilled in the art might easily imagine that once the buckling of the metal wires or cords begins, the cyclical flexure associated with the rolling of the uninflated or underinflated tire will lead eventually to fatigue failure of the metal monofilament wires or cords. Such fatigue failures of the wires or cords 56 will further reduce the ability of the sidewalls to support the uninflated tire's load. In addition, the broken ends of the failed wires or cords 56 have the potential to pierce the inner liner 60 and perhaps even to penetrate into the wedge insert sidewall reinforcement 52.

The present invention relates to the use of circumferentially disposed fabric treatments, as a way to provide anti-buckling support for the metal reinforcing wires or cords 56 of the first ply 54. Two types of fabric treatment are described hereinafter.

Figure 3:
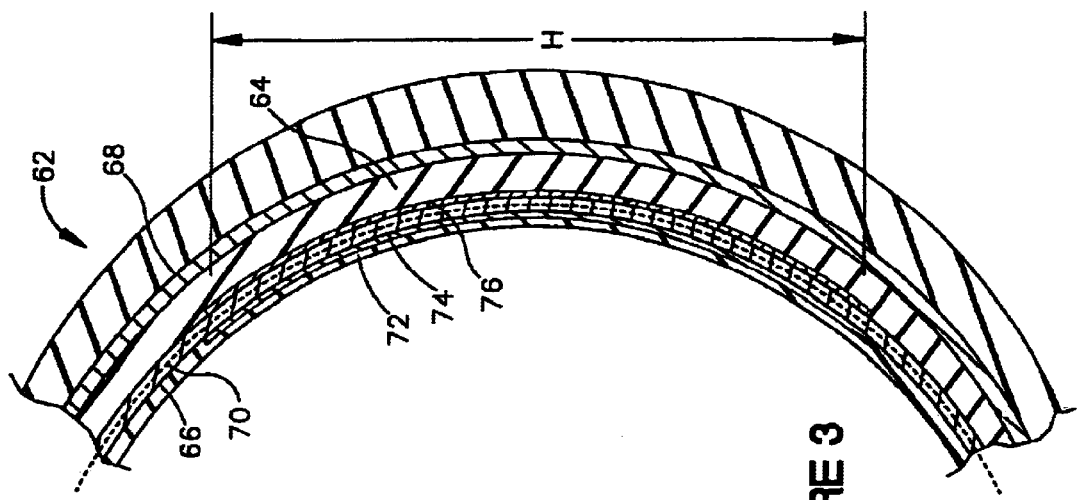
FIG. 3 is a cross-sectional view showing two fabric treatments disposed adjacent to the metal-reinforced inner ply.

FIG. 3 shows a fragmentary cross-sectional view of a sidewall segment 62 that is similar in overall design to the sidewall segment 50 shown in FIGS. 2A and 2B. The sidewall segment 62 of FIG. 3 includes a wedge insert 64 disposed between a first or inner carcass ply 66 and a second or outer carcass ply 68. The first carcass ply 66 is reinforced with metal wires (monofilaments) or cords 70. (The first carcass ply 66 shown in FIG. 3 is essentially the same as the corresponding ply 54 shown in FIGS. 2A and 2B.) An inner liner 72 (which is essentially the same as the inner liner 60 shown in FIGS. 2A and 2B) is disposed axially inward of the second ply 68 (which is essentially the same as the second carcass ply 58 shown in FIGS. 2A and 2B.) The inventive feature of the present invention comprises the incorporation of two fabric layers 74,76. The first fabric layer 74 is disposed between the inner liner 72 and the first ply 66 while the second fabric layer 76 is disposed between the first ply and the wedge insert 64.

(NOTE: In FIGS. 2A, 2B, 3 and 4, such conventional tire components as the inner liner, the ply layers and the wedge insert are essentially the same despite the use of different identifying numbers in the respective FIGURES. For example, the wedge insert 52 in FIGS. 2A and 2B is essentially the same as the wedge inserts 64,82,128a,128b, 168a and 168b shown respectively in the subsequent FIGS. 3 through 6.)

Each of the fabric treatment layers 74,76 shown in FIG. 3 comprises parallel-aligned cords which are oriented at angles of between 20 and 50 degrees and preferably between angles of 30 degrees and 45 degrees with respect to the circumferential direction. Typically, the fabric layer is made of materials from the group of materials that include nylon, polyester, aramid and rayon. The cords constructed to have diameters of between 0.2 millimeters (mm) and 1.5 mm, preferably between 0.3 mm and 1.0 mm. The cord density is 15 to 50 ends per inch (epi) and preferably 20 to 35 ends per inch. If the angle of the cords in the treatment layers 74,76 is less than 20°, the fabric prevents the tire from being blown up subsequent to construction of the tire on the building drum. Alternatively, if the angle is more than 50°, the fabric has a negligible effect on preventing buckling in the circumferential direction during runflat operation as described hereinafter. The angles of the respective cords within each fabric treatment 74,76 are opposite to one another about the radial direction, which is to say they are crossed with respect to one another. Thus, it follows that the fabric layers 74,76 effectively attach or "tie" to one another each of the radially oriented metallic wires or cords 70 within the first ply 66. The benefit thereby derived is such that no single reinforcing cord 70 can easily commence a circumferentially directed buckling without pulling along with it the most immediately adjacent reinforcing cords of the first ply 66. Buckling of the metal reinforcing wires or cords 70 is thereby inhibited during runflat operation wherein the wires or cords are subjected to maximal compressive loading.

The radial height H denoted in FIG. 3 represents the portion of the sidewall's overall height within which the fabric layers 74,76 are disposed. The height H corresponds to between 20 percent and 80 percent of the maximum radial reach, i.e. the length when the wedge insert is straightened out, and preferably between 40 percent and 60 percent of the radial reach of the wedge insert. If the height of the fabric layers 74,76 is less than 20 percent of the radial reach of the wedge insert, the fabric layers provide a negligible effect in preventing buckling during runflat operation. Alternatively, if the height H of the fabric layers is more than 80% of the radial reach of the wedge insert, its radially inwardmost and outwardmost portions will lie outside of the compression area and will therefore add weight to the tire without adding any corresponding advantage. The fabric layers 74,76 are centered more or less across the radially central area of the circumferentially disposed wedge insert 64, which is also the region of maximum bending-stress-induced compressive loading of the metal-reinforced first ply 66 during runflat operation.

Figure 4:
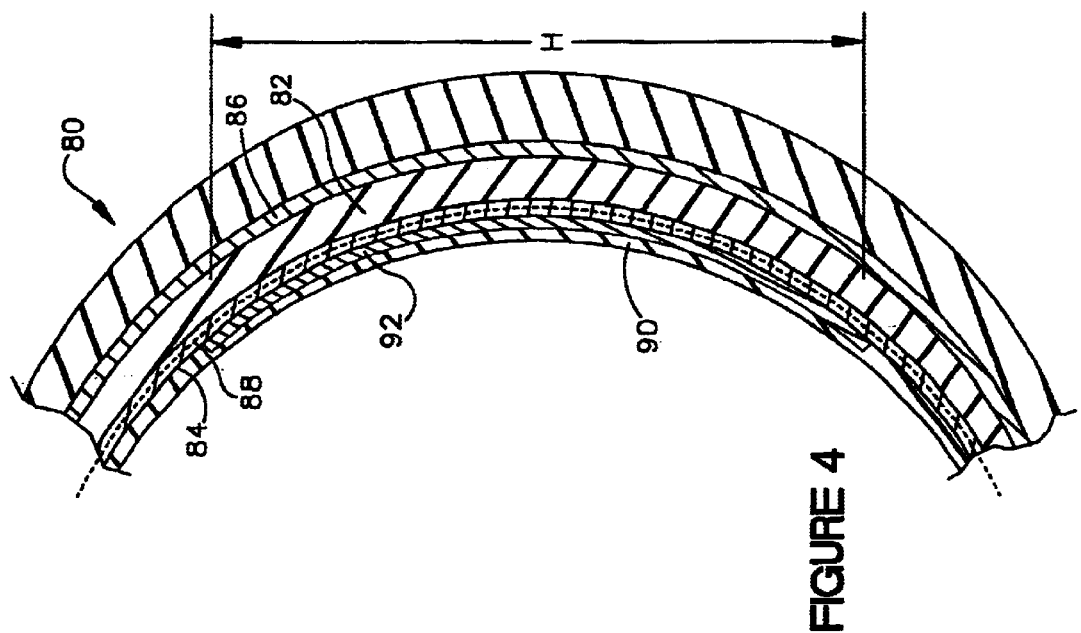
FIG. 4 is a cross-sectional view showing a single woven fabric treatment disposed adjacent to opposite sides of the metal-reinforced inner ply.

Those skilled in the art will recognize that a single woven fabric layer, placed in direct contact with the first ply 66, will provide the same anti-buckling benefit. FIG. 4 shows a fragmentary cross-sectional view of a sidewall segment so that is similar in overall design to the sidewall segment 50 shown in FIGS. 2A and 2B and the sidewall segment 62 shown in FIG. 3. The sidewall segment 80 of FIG. 4 comprises a wedge insert 82 disposed between a first carcass ply 84 and a second carcass ply 86. The first carcass ply 84 is reinforced with metal wires or cords 88. An inner liner 90 is disposed axially inward of the second ply 86. In this alternative embodiment of the present invention, the inventive feature comprises a single woven fabric layer 92, which is disposed between the inner liner 90 and the first ply 84. Notice that the woven fabric layer 92, located axially inward of the first ply 84, is most advantageously located with regard to inhibiting the above-described circumferential buckling potential of the metallic cords 88 of the first or inner ply 84.

The radial height H denoted in FIG. 4 represents the portion of the sidewall's overall height within which the single woven fabric layer 92 is disposed. The height H corresponds to between 20 percent and 80 percent and preferably between 40 percent and 60 percent of the maximum radial reach of the wedge insert 82. The woven fabric layer 92 is centered more or less across the radially central part of the circumferentially disposed wedge insert 82, which is also the region of maximum bending-stress-induced compressive loading of the metal-reinforced first or inner ply 84 during runflat operation. The woven fabric layer 92 is made of woven threads made of a material from the class of materials that includes nylon, polyester, aramid and rayon. The threads have diameters of between 0.2 mm and 1.5 mm, preferably between 0.3 mm and 1.0 mm. The fabric is woven to a density of between 15 epi and 50 epi, preferably between 20 epi and 35 epi. The woven threads of the material cross each other and are at an angle of between 20 and 50 degrees and preferably at an angle of between 30 and 45 degrees so that the threads cross the cords of ply 84 against which the woven material is applied.

The Invention in Relation to the Prior Art U.S. Pat. No. 3,386,486 ('486) by Kovac describes a tire construction in which radial and bias plies are sandwiched between one another. The fabric bias plies do not reach radially inward to the beads, as do the radial plies. The '486 patent can be distinguished from the present invention in that the former: (1) does not describe a runflat tire; (2) discloses fabric bias plies that are not restricted to the sidewall regions; (3) the first or inner ply is not metal reinforced; and (4) the bias plies are do not serve the purpose of inhibiting compression-induced buckling of the radial plies.

U.S. Pat. No. 2,430,560 ('560) by Elliot describes a tire construction in which a plurality of ply layers sandwich with one another for the expressed purpose (paraphrasing) of providing zones of increased stretchability in the sidewall portions of the casing adjacent to the bead portions (see column 1, lines 28+ of the '560 patent). The sidewalls of '560 are accordingly isolated from the bead regions in terms of relative flexibility such that while the sidewalls are given greater rigidity, flexing is possible in the radially inwardmost regions that are near to the beads. Thus while '560 patent provides rigid sidewalls, the tire is not per se a runflat tire nor does it use any of the multiple and mutually sandwiching plies to inhibit buckling of compression loaded reinforcing cords, metal or otherwise, of other carcass ply layers. Moreover, none of the sandwiching layers is restricted exclusively to the sidewall regions.

U.S. Pat. No. 1,393,952 ('952) by Miller has FIGURES showing a plurality of plies similar to those shown in the FIGURES of the '560 patent described hereinbefore. "Outside and inside plies of fabric and cord alternate plies of fabric and cord alternate all the way through the side wall immediately above the bead . . . " (col. 1, 11. 19+). Thus, while the '952 patent provides rigid sidewalls due to the many layers of plies, the tire is not, as with the '560 patent described before, per se a runflat tire nor does it use any of the multiple and mutually sandwiching plies to inhibit buckling of compression loaded reinforcing cords, metal or otherwise, of other carcass ply layers. Also, as with '560 patent above, none of the sandwiching layers is restricted exclusively to the sidewall regions, but rather to the bead regions where the operation intend is other than inhibition of compression-induced buckling of ply reinforcing cords, metal or otherwise.

European Patent Document 0 507 184 A1 ('184) by Johnson describes bias-ply reinforcing fabric layers in the outer portions of sidewalls of an EMT tire or runflat tire. The main intent of the invention described in the '184 document is to provide an EMT tire having a high section height, i.e., a high-profile tire. A bias-ply layer extends across the sidewall regions from beneath the axially outwardmost portions of the steel belts and thence radially inward to a location that is both radially inward of the turnup ends and radially inward of the radially outwardmost portion of the apex in each bead region. The bias-ply layers of the '184 document are, however, located immediately axially outward of the second or outermost full carcass ply layer that extends from bead to bead. Each of the two bias-ply layers "provides an increased stiffness in the side wall due to the sheer loading therebetween when the tire is in the run flat condition" (col. 7, ll. 23+). Thus '184 differs from the present invention in the specific following ways: (1) the bias-ply fabric layer, which is equivalent to the single woven fabric treatment of the present invention, is intended to bear tension during runflat operation; and (2) it is not intended to inhibit buckling of metal-reinforcing cord members of any other part of the tire.

European Patent Document 0 475 258 A1 ('258) by Ghilardi describes an EMT tire having a fabric layer 17 (called "textile reinforcing strip" in col 6, 1. 44 and referred to as "strips" in col. 8, 1. 39). While the fabric layer 17 is disposed axially inward of and adjacent to the first or inner ply, its function seems to be intended to carry compression loading rather than, as with the present invention, to inhibit buckling of the reinforcing cords of the first carcass ply during runflat operation.

Embodiments

Figure 5:
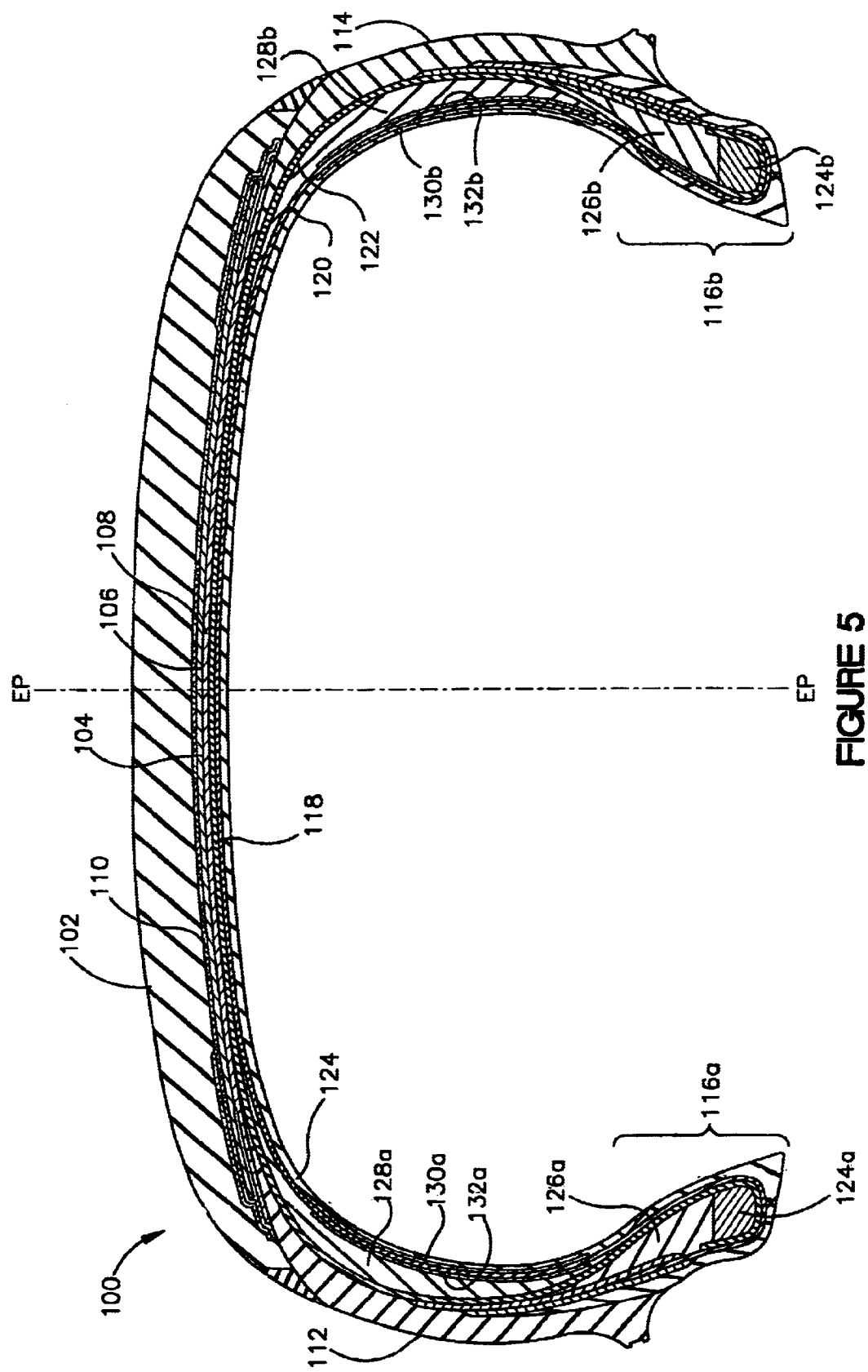
FIG. 5 is a cross-sectional view of one embodiment of the runflat tire of the present invention.

A first embodiment of the invention is illustrated in FIG. 5, which shows a cross-sectional view of a pneumatic radial ply EMT or runflat tire 100. The tire 100 has a tread 102, a belt structure 104 comprising belts 106,108, a fabric overlay 110 disposed between the tread and the belt structure, a pair of sidewall portions 112,114, and a carcass structure 118. The carcass 118 comprises a first or inner ply 120 and a second or outer ply 122, a pair of bead regions 116a,116b, and a gas-impervious inner liner 124. The bead regions 116a,116b comprise a pair of beads 124a,124b, respectively, and a pair of bead filler apexes 126a,126b, respectively. The sidewalls 112,114 each contain one sidewall wedge insert 128a,128b, each of which is disposed between the first ply 120 and the second ply 122. The first ply 120 is metal reinforced and, in the two sidewall regions, is sandwiched between and supported by and buttressed against compressive-load-induced buckling during runflat operation by circumferentially disposed first fabric treatment layers 130a,130b (compare treatment layers 74), located between the first carcass ply 120 and the inner liner 124, and circumferentially disposed second fabric treatment layers 132a,132b (compare treatment layers 76) located between the first carcass ply layer 120 and the wedge insert 128a, 128b, respectively.

Figure 6:
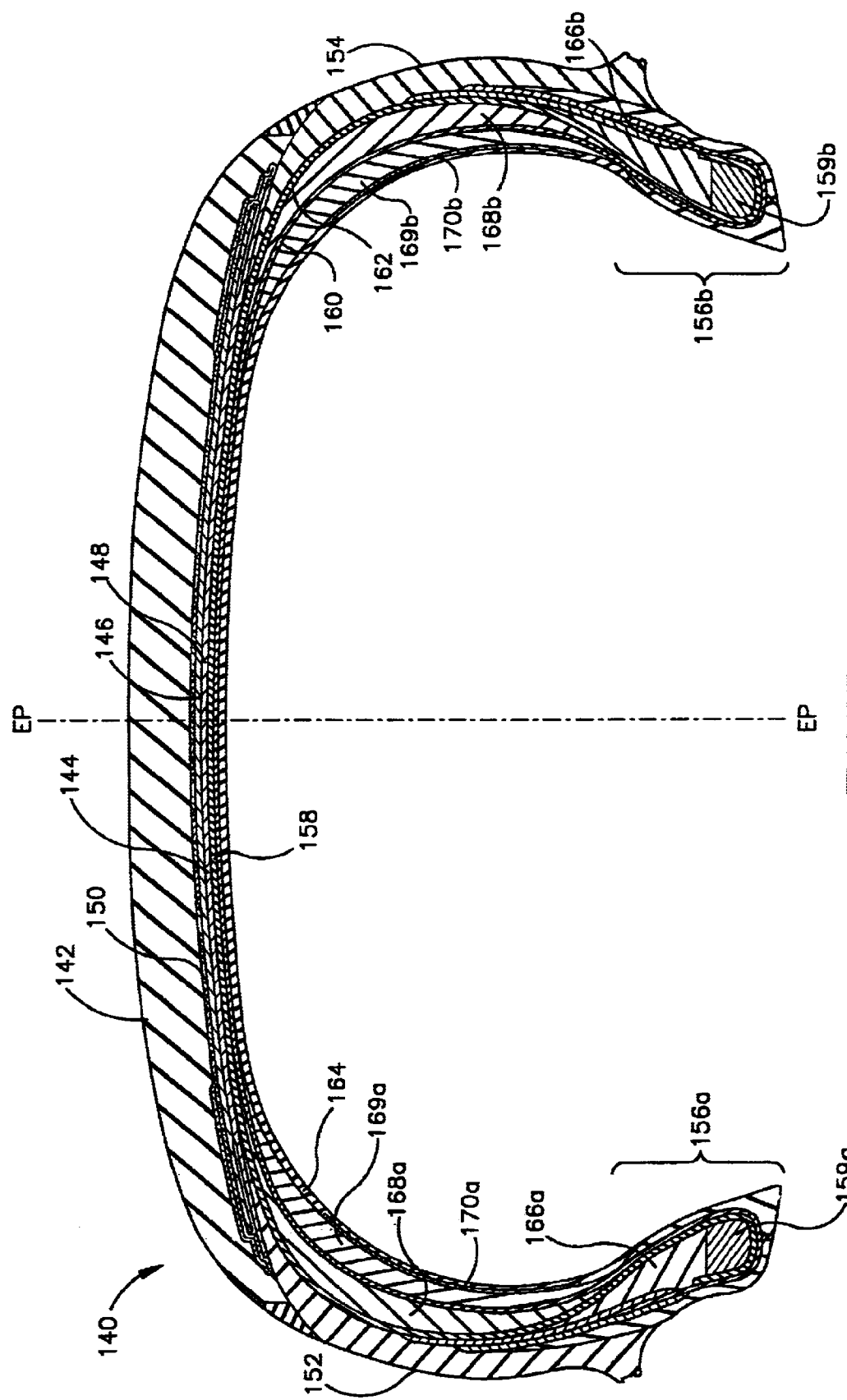
FIG. 6 is a cross-sectional view of a second embodiment of the runflat tire of the present invention.

A second embodiment of the invention is illustrated in FIG. 6, which shows a cross-sectional view of a pneumatic radial ply EMT or runflat tire 140. The tire 140 has a tread 142, a belt structure 144 comprising belts 146,148, a fabric overlay 150 disposed between the tread and the belt structure, a pair of sidewall portions 152,154, and a carcass structure 158. The carcass 158 comprises a first or inner ply 160, a second or outer ply 162, a pair of bead regions 156a,156b, and a gas-impervious inner liner 164. The bead regions 156a,156b each comprise beads 159a,159b, respectively, and bead filler apexes 166a,166b, respectively. The sidewalls 152,154 each contain at least one sidewall wedge insert 168a,168b, respectively, disposed between the first or inner carcass ply 160 and the second or outer carcass ply 162. A second insert 169a,169b between the inner liner 164 and the inner first carcass ply 160 can also be provided, as desired, for each embodiment. The first carcass ply 160 is metal reinforced and, in the sidewall regions 152,154, is supported by and buttressed against compressive-load-induced buckling during runflat operation by circumferentially disposed woven fabric treatment layers 170a,170b, respectively, (compare fabric treatment 92) located between the first carcass ply and the inner liner 164.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. A pneumatic radial ply runflat tire having a carcass comprising:
    an inner liner,
    an inner carcass ply reinforced with substantially radially aligned metal wires and disposed axially outward of the inner liner,
    an outer carcass ply disposed axially outward of the inner carcass ply, and
    a wedge insert disposed circumferentially in a sidewall region of the tire between the inner carcass ply and the outer carcass ply, and
    a first fabric layer comprising cords and disposed circumferentially in the sidewall region of the tire between the inner liner and the inner carcass ply, and
    a second fabric layer comprising cords and disposed circumferentially in the sidewall region of the tire between the inner carcass ply and the wedge insert,
    wherein the inner carcass ply is sandwiched between the first and second fabric layers.

2. Tire, according to claim 1, wherein:
    the cords of the first fabric layer are parallel-aligned.

3. Tire, according to claim 1, wherein:
    the cords of the first fabric layer have both radially inwardmost and radially outwardmost portions disposed within the sidewall region.

4. Tire, according to claim 1, wherein:
    the cords of the first fabric layer are oriented at angles of between 20 and 50 degrees with respect to a circumferential direction of the tire.

5. Tire, according to claim 1, wherein:
    the cords of the first fabric layer are oriented at angles of between 30 and 45 degrees with respect to a circumferential direction of the tire.

6. Tire, according to claim 1, wherein:
    the cords of the first fabric layer have diameters of between 0.2 millimeters (mm) and 1.5 mm.

7. Tire, according to claim 1, wherein:
    the cords of the first fabric layer have diameters of between 0.3 millimeters (mm) and 1.0 mm.

8. Tire, according to claim 1, wherein:

the cords of the first fabric layer have a cord density of 15 to 50 ends per inch (epi).

9. Tire, according to claim 1, wherein:

the cords of the first fabric layer have a cord density of 20 to 35 ends per inch (epi).

10. Tire, according to claim 1, wherein:

the first fabric layer comprises a material selected from the group consisting of nylon, polyester, aramid and rayon.

11. Tire, according to claim 1, wherein:

the wedge insert has a radial reach within the sidewall of the tire, and the first fabric layer has a radial width of between 20 percent and 80 percent of the reach of the wedge insert.

12. Tire, according to claim 1, wherein:

the wedge insert has a radial reach within the sidewall of the tire, and the first fabric layer has a radial width of between 40 percent and 60 percent of the reach of the sidewall insert.

13. Tire, according to claim 1, wherein:

the first fabric layer is centered substantially across a radially central area of the wedge insert.

14. Tire, according to claim 1, wherein:

the first fabric layer is in direct contact with the inner carcass ply.

15. Tire, according to claim 1, wherein:

the cords of the first fabric layer are parallel-aligned, the cords of the second fabric layer are parallel-aligned, and the respective parallel-aligned cords of the first and second fabric layers are oriented at opposite angles of between 20 degrees and 50 degrees with respect to a circumferential direction of the tire.

16. Tire, according to claim 1, wherein:

the cords of the first fabric layer are oriented at angles between 20 and 50 degrees with respect to a circumferential direction of the tire, and the cords of the second fabric layer are oriented at angles between 20 and 50 degrees with respect to a circumferential direction of the tire.

17. Tire, according to claim 16, wherein:

the cords of the first fabric layer have diameters of between 0.2 millimeters (mm) and 1.5 mm, and the cords of the second fabric layer have diameters of between 0.2 millimeters (mm) and 1.5 mm.

18. Tire, according to claim 1, wherein:

the cords of the first fabric layer have a cord density of 15 to 50 ends per inch (epi), and the cords of the second fabric layer have a cord density of 15 to 50 ends per inch (epi).

19. Tire, according to claim 1, wherein:

the wedge insert has a radial reach within the sidewall of the tire, and the first fabric layer has a radial width of between 20 percent and 80 percent of the reach of the wedge insert, and the second fabric layer has a radial width of between 20 percent and 80 percent of the reach of the wedge insert.

20. Tire, according to claim 1, wherein:

the cords of the second fabric layer are oriented at angles of between 30 and 45 degrees with respect to a circumferential direction of the tire.

* * * * *